T. C. MORRIS.
FEEDING ROLLER CONSTRUCTION.
APPLICATION FILED JUNE 15, 1916.
1,242,020.
Patented Oct. 2, 1917.
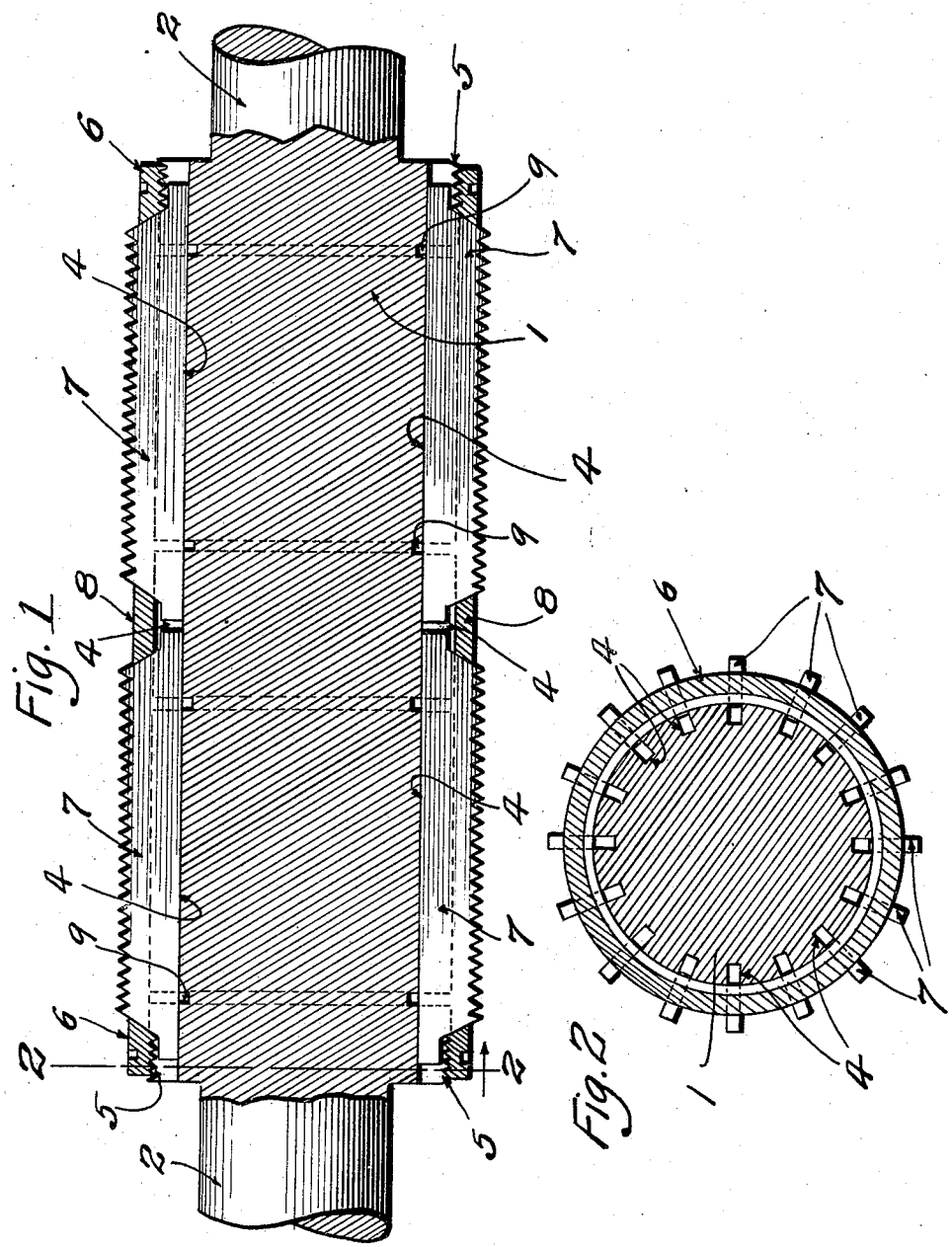
Inventor
Thomas C. Morris
By T. R. Cornwall, Atty.

UNITED STATES PATENT OFFICE.

THOMAS C. MORRIS, OF ATLANTA, GEORGIA, ASSIGNOR TO PETER VREDENBURGH, JR., OF VREDENBURGH, ALABAMA.

FEEDING-ROLLER CONSTRUCTION.

1,242,020.  Specification of Letters Patent.  Patented Oct. 2, 1917.

Application filed June 15, 1916. Serial No. 103,761.

*To all whom it may concern:*

Be it known that I, THOMAS C. MORRIS, a citizen of the United States, residing at the city of Atlanta, county of Fulton and State of Georgia, have invented a certain new and useful Improvement in Feeding-Roller Constructions, of which the following is a full, clear, and exact description, such as will enable others skilled in the art to which it appertains to make and use the same, reference being had to the accompanying drawings, forming part of this specification.

This invention relates to certain improvements in feed rollers for use on lumber machines, wherein they are employed for the purpose of feeding lumber to saws or cutters, and holding the lumber securely to the action thereof.

The specific improvement constituting my present invention is intended primarily as a form of construction for rollers of small diameter, wherein it is preferable to form the barrel of the roller integral, and integral with its journals, and at the same time to permit of the ready removal and replacement of operating portions which are subject to wear in the use of the device.

In U. S. Letters Patent to Thomas A. Coleman, Nos. 1,177,931 of April 4, 1916, and 1,208,294 of December 12, 1916, have been disclosed various forms of feeding rollers with interchangeable work engaging parts, the carrier of the work engaging parts being made up of a number of relatively movable drums axially mounted on a shaft, and provided with coacting means whereby the engaging elements, carriers and the shaft may be so clamped together by terminal pressure means as to form a substantially unitary structure. In rollers of very small diameter, it is sometimes impractical or inexpedient to form the carriers separately, or separately from the shaft, while at the same time, it is desirable that the construction be such as to permit the interchangeability of the engaging elements.

In my present invention, I form a roller which may be made rigid and strong in small diameter, and which at the same time permits the ready interchangeability of the work engaging parts.

By reference to the accompanying drawings, it will be understood that:

Figure 1 is a longitudinal section through my improved roller; and

Fig. 2 is a transverse section through the same, the same being taken substantially on line 2—2 of Fig. 1.

Referring to the illustration more in detail, it will be observed that the roller includes a substantially cylindrical drum portion 1 formed with journals 2 at its extremities. The drum portion is provided with longitudinal slots 4 about its periphery extending radially, which slots may extend into the drum radially or non-radially. At its extremities the drum is provided with annular screw threads 5. Annular clamping rings 6 are formed so that they may be screwed onto the ends of the drum by means of their screw threads which mesh with the threads 5.

A plurality of similar blades 7, comparatively thin and of hard metal, are provided, said blades being of the thickness necessary to permit their fitting snugly in the slots 4. These blades are somewhat wider than the depth of the slots, so that they extend therefrom any desired distance, and their extending margins may be suitably serrated or otherwise formed in order to provide effective engaging elements for operably engaging the lumber upon which the roller is designed to operate. Depending upon the length of the drum, these blades may be continuous from end to end thereof, or there may be a plurality of shorter blades disposed in a slot along the length of the drum. In such case, intermediate clamping rings 8 are arranged to coöperate with the inner extremities of the blades. These blades have portions at their extremities diverging from their operating edges, and the sides of the clamping rings 6 and 8 are correspondingly undercut or beveled so as to coöperate with the said portions of the blades. As the clamping rings are movable longitudinally over the outer surface of the drum,—the terminal rings 6 by means of their screw threads and the intermediate ring 8 slidably along the surface of the drum,—it will be seen that they will be effective, when moved toward the blades, to engage them and transmit pressure to them. The engagement between the clamping rings and the blades will be effective in retaining the blades in their seats, and the longitudinal pressure exerted upon blades from one of the terminal rings will be effectively transmitted through such blades and through any intermediate rings and blades, to the blades and ring at the opposite extremity of the drum. In this fashion, the blades throughout the length of the roller may be loosened or effectively clamped in place by operation of a clamping ring at one end of the roller.

Inasmuch as the blades are the parts subjected to the hardest usage, because of their constant operation upon the lumber, they are the parts most subject to wear. In the event of wear of the blades, the roller becomes inaccurate in its feeding operation, with the result that the lumber is not fed straight to the action of the saws or cutters, and a defective product is the result. In my improved roller, however, when blades are thus worn, they may be very quickly and easily replaced with unworn blades by simply slacking up one or both of the terminal rings 6, which may be done with a spanner, whereupon the defective blades may be removed and replaced. If desired, in order to facilitate the removal of the blades, annular grooves 9 may be formed in the surface of the drum, the same being deeper than the longitudinal slots 4, to permit the insertion of a suitable tool below the lower edge of the blades for the purpose of exerting the necessary leverage to pry the latter out of their seats.

By utilizing the construction above described, I am able to form a feed roller in which the working elements at any selected point along the length of the roller may be renewed easily and quickly, and at the same time this form of construction affords great strength and rigidity for rollers of small diameter.

I am aware that the structure is capable of obvious modifications without departing from the scope of the invention as set out in the following claims.

What I claim is:

1. A feed roller construction comprising a drum provided with terminal journals and having peripheral longitudinally extending slots, a plurality of engaging elements seated in each of the slots in alinement and movable longitudinally therein, and clamping rings movable longitudinally on the outer face of the drum and adapted to coöperate with the extremities of the engaging elements on both sides thereof to clamp them into the slots.

2. A feed roller construction comprising a drum member provided with longitudinal peripherally disposed slots and having journals extending from its extremities, a plurality of engaging elements in the form of comparatively thin bars seated in each of said slots and longitudinally movable therein, a clamping ring encircling the drum member and movable longitudinally on the peripheral face thereof and adapted to engage the extremities of bars in the slots on each side thereof, and means coöperating with the other extremities of such bars for the purpose described.

3. A feed roller including a substantially cylindrical drum member provided with longitudinally extending peripheral slots, engaging elements in the form of comparatively thin bars seated in said slots and longitudinally movable therein, a terminal clamping ring having screw thread engagement with the curved face of the drum and adapted to engage the extremities of adjacent engaging elements, and an intermediate clamping ring freely movable longitudinally over the slotted portion of the drum member and adapted to coöperate with the extremities of engaging elements on both sides thereof for the purpose described.

In testimony whereof I hereunto affix my signature in the presence of two witnesses, this 10th day of June, 1916.

T. C. MORRIS.

Witnesses:
L. A. SUNDMACHER,
CARL H. BLANBEY.

Copies of this patent may be obtained for five cents each, by addressing the "Commissioner of Patents, Washington, D. C."